United States Patent
Kojima et al.

(10) Patent No.: US 11,862,785 B2
(45) Date of Patent: Jan. 2, 2024

(54) LITHIUM ION CONDUCTIVE MATERIAL, ALL-SOLID-STATE SECONDARY BATTERY, AND METHOD OF MANUFACTURING SOLID ELECTROLYTE

(71) Applicant: NGK INSULATORS, LTD., Nagoya (JP)

(72) Inventors: Miyuki Kojima, Nagoya (JP); Keita Miyanishi, Nagoya (JP); Yosuke Sato, Nagoya (JP); Yuji Katsuda, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 753 days.

(21) Appl. No.: 17/022,532

(22) Filed: Sep. 16, 2020

(65) Prior Publication Data
US 2021/0009434 A1    Jan. 14, 2021

Related U.S. Application Data

(63) Continuation of application No. PCT/JP2018/012946, filed on Mar. 28, 2018.

(51) Int. Cl.
*H01M 4/1315* (2010.01)
*C01D 15/04* (2006.01)
(Continued)

(52) U.S. Cl.
CPC .......... *H01M 4/1315* (2013.01); *C01D 15/04* (2013.01); *H01M 4/136* (2013.01);
(Continued)

(58) Field of Classification Search
CPC ............... H01M 4/1315; H01M 4/136; H01M 10/0525; H01M 10/0562;
(Continued)

(56) References Cited

U.S. PATENT DOCUMENTS

2013/0202971 A1    8/2013    Zhao et al.
2014/0113187 A1*   4/2014    Winoto ............ H01M 10/0525
                                                429/189
(Continued)

FOREIGN PATENT DOCUMENTS

JP    2014-096352 A1    5/2014
JP    2014-523626 A1    9/2014
(Continued)

OTHER PUBLICATIONS

English translation of the International Preliminary Report on Patentability (Chapter I)(Application No. PCT/JP2018/012946) dated Oct. 8, 2020.
Georg Schwering, et al., "High Lithium Ionic Conductivity in the Lithium Halide Hydrates $Li_{3-n}(OH_n)Cl$ ($0.83 \le n \le 2$) and $Li_{3-n}(OH_n)Br$ ($1 \le n \le 2$) at Ambient Temperatures," *Chemphyschem*, Apr. 2003, pp. 343-348.
(Continued)

*Primary Examiner* — James M Erwin
(74) *Attorney, Agent, or Firm* — BURR PATENT LAW, PLLC

(57) ABSTRACT

A lithium ion conductive material has a composition formula of $Li_a(OH)_bF_cBr$, where $1.8 \le a \le 2.3$, $b=a-c-1$, $0.01 \le c \le 0.11$, and includes an antiperovskite-type crystal phase. Preferably, the lithium ion conductive material further includes a layered antiperovskite-type crystal phase. More preferably, $0 \le B/(A+B) \le 0.2$ is satisfied, where A is the peak intensity in the vicinity of $2\theta=31.2°$ in the X-ray diffractometry using Cu-Kα ray and B is the peak intensity in the vicinity of $2\theta=30.2°$.

9 Claims, 1 Drawing Sheet

(51) Int. Cl.
　　　*H01M 4/136*　　　(2010.01)
　　　*H01M 10/0525*　　(2010.01)
　　　*H01M 10/0562*　　(2010.01)
　　　*H01M 4/02*　　　　(2006.01)

(52) U.S. Cl.
　　　CPC ... *H01M 10/0525* (2013.01); *H01M 10/0562* (2013.01); *C01P 2002/72* (2013.01); *C01P 2006/40* (2013.01); *H01M 2004/027* (2013.01); *H01M 2004/028* (2013.01); *H01M 2300/008* (2013.01)

(58) Field of Classification Search
　　　CPC ..... H01M 2004/027; H01M 2004/028; H01M 2300/008; C01P 2002/72; C01P 2006/40
　　　USPC ......................................................... 429/323
　　　See application file for complete search history.

(56) References Cited

U.S. PATENT DOCUMENTS

| | | |
|---|---|---|
| 2014/0162137 A1 | 6/2014 | Di Noto et al. |
| 2016/0365602 A1 | 12/2016 | Sousa Soares De Oliveira Braga et al. |
| 2019/0006672 A1* | 1/2019 | Yushin ................ H01M 10/052 |

FOREIGN PATENT DOCUMENTS

| | | |
|---|---|---|
| JP | 2014-238925 A1 | 12/2014 |
| JP | 2017-513788 A1 | 6/2017 |

OTHER PUBLICATIONS

Yutao Li, et al., "Fluorine-Doped Antiperovskite Electrolyte for All-Solid-State Lithium-Ion Batteries," *Angew Chem. Int. Ed.*, 2016, vol. 55, pp. 9965-9968.

International Search Report and Written Opinion (Application No. PCT/JP2018/012946) dated Jun. 19, 2018.

* cited by examiner

LITHIUM ION CONDUCTIVE MATERIAL, ALL-SOLID-STATE SECONDARY BATTERY, AND METHOD OF MANUFACTURING SOLID ELECTROLYTE

CROSS-REFERENCE TO RELATED APPLICATION

The present application is a continuation application of International Application No. PCT/JP2018/012946, filed on Mar. 28, 2018. The content of this application is incorporated herein by reference in their entirety.

TECHNICAL FIELD

The present invention relates to a lithium ion conductive material, and the lithium ion conductive material is used for, e.g., an all-solid-state secondary battery.

BACKGROUND ART

Conventionally, lithium batteries have been used for portable devices such as personal computers, cellular phones, or the like. In the lithium battery for these uses, used is a liquid electrolyte in which lithium salt is dissolved in a combustible organic solvent, i.e., an electrolyte solution as a medium for carrying ions. For the battery using the electrolyte solution, it is required to take various measures for preventing a liquid spill of the electrolyte solution, ignition, explosion, or the like. On the other hand, in recent years, attention has been directed to an all-solid-state lithium battery using a solid lithium ion conductive material which makes it possible to easily ensure safety. Since all the elements are solid in the all-solid-state lithium battery, safety measures are easily ensured and problems of performance degradation due to the liquid spill or corrosion are less likely to be caused.

One of the studies on the lithium ion conductive material is, for example, "High Lithium Ionic Conductivity in the Lithium Halide Hydrates $Li_{3-n}(OH_n)Cl$ ($0.83 \le n \le 2$) and $Li_{3-n}(OH_n)Br$ ($1 \le n \le 2$) at Ambient Temperatures", by Georg Schwering and other three, CHEMPHYSCHEM, April 2003, pp. 343 to 348, published by WILEY-VCH. In this document, experiments are performed on various $Li_{3-n}(OH_n)Cl$ ($0.83 \le n \le 2$) and $Li_{3-n}(OH_n)Br$ ($1 \le n \le 2$) which are lithium ion conductive materials each having an antiperovskite-type structure and the relation between a temperature and ionic conductivity of each of these materials is reported.

The specification of US Patent Application Publication No. 2013/0202971 describes antiperovskite-type lithium ion conductive materials such as $Li_3OCl$, $Li_3OBr$, or the like. In "Fluorine-Doped Antiperovskite Electrolyte for All-Solid-State Lithium-Ion Batteries", by Yutao Li and other ten, Angewandte Chemie International Edition, 2016, 55, pp. 9965 to 9968, published by WILEY-VCH, the relation between a temperature and lithium ionic conductivity on antiperovskite-type $Li_2(OH)_{0.9}F_{0.1}Cl$ and $Li_2OHBr$ is reported.

Thus, though studies on various materials have been made as to the lithium ion conductive material having high lithium ionic conductivity, in order to broaden the options of the materials in accordance with various properties required to batteries, it is required to propose many kinds of materials having relatively high lithium ionic conductivity.

SUMMARY OF INVENTION

It is an object of the present invention to provide a new lithium ion conductive material having high lithium ionic conductivity.

The lithium ion conductive material according to the present invention has a composition formula of $Li_a(OH)_bF_cBr$, where $1.8 \le a \le 2.3$, $b = a - c - 1$, $0.01 \le c \le 0.11$, and includes an antiperovskite-type crystal phase. Preferably, the lithium ion conductive material further includes a layered antiperovskite-type crystal phase.

Preferably, in the lithium ion conductive material, $0 \le B/(A+B) \le 0.2$ is satisfied, where A is the peak intensity in the vicinity of $2\theta = 31.2°$ in the X-ray diffractometry using Cu-Kα ray and B is the peak intensity in the vicinity of $2\theta = 30.2°$.

The present invention is also intended for an all-solid-state secondary battery including the above-described lithium ion conductive material. In one preferred embodiment, the positive electrode of the all-solid-state secondary battery includes a lithium composite oxide having a layered rock salt structure, and the negative electrode includes Ti, and includes a material in which a lithium ion is insertable and removable at 0.4 V or more with the Li/Li$^+$ equilibrium potential as the reference.

Preferably the lithium composite oxide having a layered rock salt structure is lithium cobalt oxide.

The present invention is still also intended for a method of manufacturing a solid electrolyte. In the method of manufacturing a solid electrolyte, LiBr, LiOH, and LiF are heated at a temperature not lower than 250° C. and not higher than 600° C. for 0.1 hours or more while being stirred at a molar ratio of 1:X:Y, where $0.87 \le X \le 1$, $0.01 \le Y \le 0.13$, under an Ar gas atmosphere.

These and other objects, features, aspects and advantages of the present invention will become more apparent from the following detailed description of the present invention when taken in conjunction with the accompanying drawings.

DESCRIPTION OF EMBODIMENTS

Figure 1:
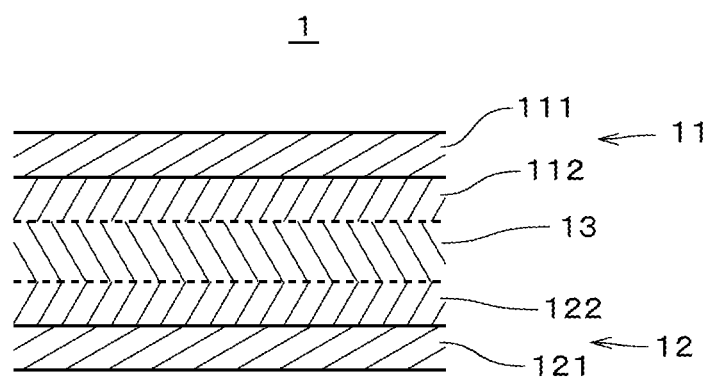
FIG. 1 is a longitudinal section showing an all-solid-state secondary battery.

FIG. 1 is a longitudinal section showing an all-solid-state secondary battery 1 in accordance with one preferable preferred embodiment of the present invention. The all-solid-state secondary battery 1 has a positive electrode 11, a lithium ion conductive material layer 13 which is a solid electrolyte or includes a solid electrolyte, and a negative electrode 12 in this order from the upper side. Specifically, the lithium ion conductive material layer 13 is positioned between the positive electrode 11 and the negative electrode 12. The positive electrode 11 includes a current collector 111 and a positive electrode layer 112 including a positive electrode active material. The negative electrode 12 includes a current collector 121 and a negative electrode layer 122. The negative electrode layer 122 is formed of a material including a negative electrode active material.

The positive electrode active material of the positive electrode layer 112 is preferably a lithium composite oxide having a layered rock salt structure. More preferably, the lithium composite oxide having a layered rock salt structure is lithium cobalt oxide ($LiCoO_2$). The lithium composite oxide is preferably a sintered body. Preferably, the negative electrode layer 122 includes Ti, and a lithium ion is insertable therein and removable therefrom at 0.4 V or more with the Li/Li$^+$ equilibrium potential as the reference. In other words, the lithium ion is insertable and removable at a potential higher than the Li/Li$^+$ equilibrium potential by 0.4 V or more. Specific examples of such a material are lithium titanate ($Li_4Ti_5O_{12}$), niobium titanium composite oxide ($Nb_2TiO_7$), and titanium oxide ($TiO_2$).

The respective compositions and materials of the positive electrode 11 and the negative electrode 12 in the all-solid-state secondary battery 1 are not limited to those described above, but other various compositions and materials may be adopted.

In an exemplary manufacture of the all-solid-state secondary battery 1, prepared are the positive electrode 11 obtained by forming the current collector 111 on the positive electrode layer 112 and the negative electrode 12 obtained by forming the current collector 121 on the negative electrode layer 122. Then, while the positive electrode layer 112 and the negative electrode layer 122 face the lithium ion conductive material, the lithium ion conductive material is sandwiched between the positive electrode 11 and the negative electrode 12 and heated, or the like, and the lithium ion conductive material thereby becomes the lithium ion conductive material layer 13 and thus the all-solid-state secondary battery 1 is manufactured. The positive electrode 11, the lithium ion conductive material layer 13, and the negative electrode 12 may be connected by any other method. Further, the lithium ion conductive material layer 13 may be formed by adding another material to the lithium ion conductive material. In other words, the lithium ion conductive material layer 13 is a layer including the lithium ion conductive material.

Next, Experimental Examples on the lithium ion conductive material will be described.

Experimental Example 1

As raw materials, prepared are LiOH (having a purity of 98.0% or more) and LiBr (having a purity of 99.9% or more) which are commercially available. In a glove box under an Ar gas atmosphere whose dew point temperature is −50° C. or lower, these raw materials are weighed and mixed so that LiOH:LiBr should be 1.0:1.0 (molar ratio). The mixed powder obtained thus is put into an alumina crucible (having a purity of 99.7%) and then into a quartz tube, and the quartz tube is sealed by a flange.

This quartz tube is set in a tube furnace, and a heat treatment is performed at 350° C. for 30 minutes while Ar gas whose dew point temperature is −50° C. or lower is carried from a gas introduction port of the flange and exhausted from a gas exhaust port and the mixed powder is stirred. After cooling, the gas introduction port and the gas exhaust port are closed, and the crucible is taken out again in the glove box under the Ar gas atmosphere whose dew point temperature is −50° C. or lower. The compound is taken out from the crucible and ground in a mortar, and powder of the lithium ion conductive material is thereby obtained.

Further, the heating temperature and the heating time under the Ar gas atmosphere may be changed as appropriate, and generally the heating temperature has only to be not lower than 250° C. and not higher than 600° C. and the heating time has only to be 0.1 hours or more.

Experimental Example 2

As the raw materials, prepared are LiOH (having a purity of 98.0% or more), LiBr (having a purity of 99.9% or more), and LiF (having a purity of 99.9%) which are commercially available. These raw materials are weighed so that LiOH:LiBr:LiF should be 0.95:1.0:0.05 (molar ratio), and the same processing as performed in Experimental Example 1 is performed, to thereby obtain the powder of the lithium ion conductive material.

Experimental Example 3

The same processing as performed in Experimental Example 2 is performed, except that these raw materials are weighed so that LiOH:LiBr:LiF should be 0.9:1.0:0.1 (molar ratio), to thereby obtain the powder of the lithium ion conductive material.

Experimental Example 4

The same processing as performed in Experimental Example 2 is performed, except that these raw materials are weighed so that LiOH:LiBr:LiF should be 0.85:1.0:0.15 (molar ratio), to thereby obtain the powder of the lithium ion conductive material.

Experimental Example 5

The same processing as performed in Experimental Example 2 is performed, except that these raw materials are weighed so that LiOH:LiBr:LiF should be 0.99:1.0:0.01 (molar ratio), to thereby obtain the powder of the lithium ion conductive material.

Experimental Example 6

The same processing as performed in Experimental Example 2 is performed, except that these raw materials are weighed so that LiOH:LiBr:LiF should be 0.87:1.0:0.13 (molar ratio), to thereby obtain the powder of the lithium ion conductive material.

Experimental Example 7

The same processing as performed in Experimental Example 2 is performed, except that these raw materials are weighed so that LiOH:LiBr:LiF should be 1.0:1.0:0.11 (molar ratio), to thereby obtain the powder of the lithium ion conductive material.

<Crystal Structure Analysis>

Figure 2:
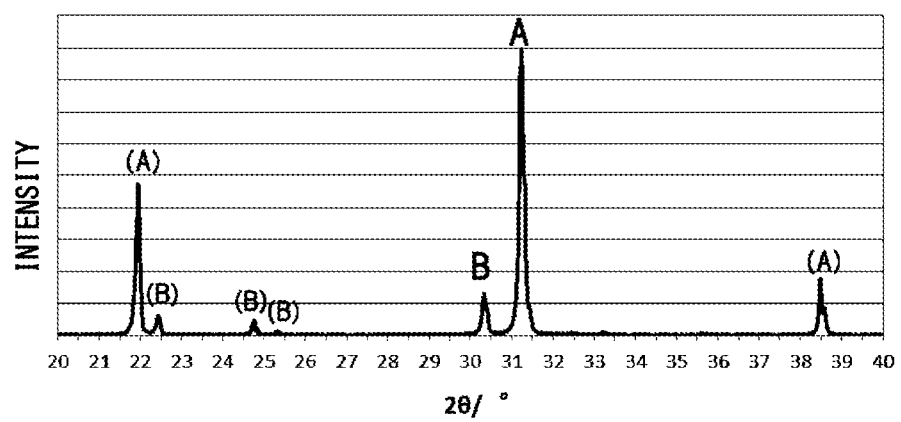
FIG. 2 is a graph showing exemplary X-ray diffraction spectrum of a lithium ion conductive material.

A crystal structure analysis is performed on the powder of the lithium ion conductive material obtained in each of above-described Experimental Examples. First, in the glove box, the powder of the lithium ion conductive material is ground in the mortar, put into a hermetic holder, and measured while not being exposed to air. The crystal phase thereof is identified by the X-ray diffractometry using Cu-Kα ray in an X-ray diffraction apparatus. Under the measurement conditions of 40 kV, 40 mA, and 2θ=10–70°, a sealed-tube X-ray diffraction apparatus (D8 ADVANCE manufactured by Bruker Corporation) is used. The step width of the measurement is 0.02°. FIG. 2 shows the X-ray diffraction spectrum in Experimental Example 3.

In the X-ray diffraction spectrum of the powder of the lithium ion conductive material in each of Experimental Examples, a peak is detected at the same position as the position of a peak of antiperovskite-type $Li_2(OH)Br$ of ICCD No. 035-0241 having the most intense peak in the vicinity of 2θ=31.2°. Since respective ionic radii of OH and F are 1.37 Å and 1.33 Å and it is thought that almost no peak shift occurs due to replacement, it is estimated that the lithium ion conductive material includes a crystal phase of antiperovskite-type $Li_2(OH)_{1-x}F_xBr$ (where $0 \leq x \leq 1$) or a crystal phase having a structure similar thereto. The word "antiperovskite-type" means that "the material has an antiperovskite-type crystal structure".

In the diffraction spectra of Experimental Examples 2 to 6, a peak is detected at the same position as the position of a peak of layered antiperovskite-type $Li_5(OH)_2Br_3$ of ICCD No. 072-6895 having the most intense peak in the vicinity of $2\theta=30.2°$. As described above, since it is thought that almost no peak shift occurs due to replacement between OH and F, it is estimated that the lithium ion conductive material includes a crystal phase of layered antiperovskite-type $Li_5(OH)_{2-x}F_xBr_3$ (where $0 \leq x \leq 2$) or a crystal phase having a structure similar thereto. The word "layered antiperovskite-type" means that "the material has a layered antiperovskite-type crystal structure".

Herein, in order to relatively compare the content percentages of the layered antiperovskite-type substance, the peak intensity ratio in the X-ray diffraction spectra of the antiperovskite-type substance and the layered antiperovskite-type substance is calculated by the following method. Assuming that the peak intensity of the X-ray diffraction spectrum in the vicinity of $2\theta=31.2°$, which is thought to correspond to the antiperovskite-type substance, is A and the peak intensity of the X-ray diffraction spectrum in the vicinity of $2\theta=30.2°$, which is thought to correspond to the layered antiperovskite-type substance, is B, a value of $B/(A+B)$ is obtained as the peak intensity ratio. Further, for this calculation, used is JADE 7 manufactured by MDI (Materials Data, Inc.), which is a commercially-available software. The peak search conditions of JADE 7 are as follows. The filter type is a parabolic filter and the peak position definition is a peak top, and as to threshold values and ranges, the threshold value $\sigma=3.0$, the peak intensity cutoff (%)=0.1%, the range of BG determination=1.0, the number of points in BG averaging=7, and the angle range=10.0 to 70.0°. Further, the variable filter length (data point) is ON, elimination of $K\alpha 2$ peak is ON, and elimination of existing peak list is ON.

<Composition Analysis>

A composition analysis is performed on the powder of the lithium ion conductive material obtained in each of above-described Experimental Examples. 1 g of the lithium ion conductive material is dissolved in 100 cc of ion exchange water, to thereby form an aqueous solution. The aqueous solution is diluted as appropriate, and a quantitative analysis is performed by the calibration curve method, specifically, by using ion chromatography (IC) on F and Br which are halogens and using ICP (inductively coupled plasma) atomic emission spectroscopy (ICP-AES) on Li. As to the OH group which cannot be directly analyzed, the molar amounts of F, Br, and Li are calculated from respective analysis values thereof, the numbers of moles thereof expressed to two decimal places are multiplied by respective valencies assuming that F has a valency of −1, Br has a valency of −1, and Li has a valency of +1, and the number of moles of OH is calculated so that the total of electric charges respectively multiplied by the numbers of moles of F, Br, Li, and OH should be 0.00 assuming that OH has a valency of −1.

<Measurement of Lithium Ionic Conductivity>

In order to measure the lithium ionic conductivity of the lithium ion conductive material which is obtained in each of above-described Experimental Examples, a SUS cell is manufactured. First, 0.05 g of ceramic spacer is mixed into 1 g of the powder of the lithium ion conductive material and this is mixed lightly in the mortar. Then, 0.02 g of the obtained powder of the lithium ion conductive material with the ceramic spacer mixed therein is so laid down as to be spread entirely on a stainless steel plate having a diameter of 15.5 mm and a thickness of 0.3 mm, which has been subjected to Au sputtering of 500 Å. Further, on the powder of the lithium ion conductive material, another stainless steel plate having a diameter of 15.5 mm and a thickness of 0.3 mm, which has been subjected to Au sputtering of 500 Å, is placed so that an Au sputtered surface thereof should be in contact with the powder of the lithium ion conductive material, to thereby form a layered body, and a weight is placed thereon.

The layered body is put into an electric furnace in the glove box, and a heat treatment is performed at 400° C. for 45 minutes, to thereby melt the powder of the lithium ion conductive material. Then, the molten lithium ion conductive material is cooled at 100° C./h, to thereby form the lithium ion conductive material layer, and the SUS cell is thereby obtained. When the thickness of the SUS cell is measured and the sum of the thicknesses of the upper and lower stainless steel plates each having a thickness of 0.3 mm and the Au sputtering thickness is subtracted from the thickness of the SUS cell, the thickness of the lithium ion conductive material layer in each of Experimental Examples is calculated to be 30 μm.

The lithium ionic conductivity of the SUS cell is measured by the AC (alternating current) impedance measurement in a range from 0.3 MHz to 0.1 Hz. The AC impedance measurement is performed with measuring terminals connected to respective surfaces of the two SUS plates which are surfaces of opposite side to the lithium ion conductive material layer.

Table 1 shows respective results of the composition analysis, the measurement of the lithium ionic conductivity, and the peak intensity ratio in the X-ray diffraction spectrum.

TABLE 1

| | Raw Material Ratio | | | Synthesis Conditions | | Analysis Values | | | Values of Composition Formula | | | | Peak |
|---|---|---|---|---|---|---|---|---|---|---|---|---|---|
| | | | | | | ICP-AES | IC | | $Li_a(OH)_bF_cBr$ | | | | Intensity |
| | LiBr | LiOH | LiF | Temp. | Time | Li | F | Br | a | b = a − c − 1 | c | Conductivity | Ratio |
| Unit | mol | mol | mol | ° C. | hr | mol/g | mol/g | mol/g | | | | S/cm | B/(A + B) |
| | 1 | X | Y | | | | | | | | | | |
| Experimental Example 1 | 1 | 1 | 0 | 350 | 0.5 | 1.87E−04 | 0.00E+00 | 9.39E−05 | 1.99 | 0.99 | 0.00 | 8.0E−07 | 0 |
| Experimental Example 2* | 1 | 0.95 | 0.05 | 350 | 0.5 | 1.87E−04 | 4.26E−06 | 8.89E−05 | 2.10 | 1.05 | 0.05 | 1.1E−06 | 0.02 |
| Experimental Example 3* | 1 | 0.9 | 0.1 | 350 | 0.5 | 1.73E−04 | 8.42E−06 | 8.64E−05 | 2.00 | 0.90 | 0.10 | 1.9E−06 | 0.13 |

TABLE 1-continued

| | Raw Material Ratio | | | Synthesis Conditions | | Analysis Values ICP-AES | | | Values of Composition Formula $Li_a(OH)_bF_cBr$ | | | | Peak Intensity Ratio |
|---|---|---|---|---|---|---|---|---|---|---|---|---|---|
| | LiBr | LiOH | LiF | | | | IC | | | | | | |
| | 1 | X | Y | Temp. | Time | Li | F | Br | a | b = a − c − 1 | c | Conductivity | |
| Unit | mol | mol | mol | °C. | hr | mol/g | mol/g | mol/g | | | | S/cm | B/(A + B) |
| Experimental Example 4 | 1 | 0.85 | 0.15 | 350 | 0.5 | 1.73E−04 | 1.05E−05 | 9.01E−05 | 1.92 | 0.80 | 0.12 | 4.6E−07 | 0.24 |
| Experimental Example 5* | 1 | 0.99 | 0.01 | 350 | 0.5 | 1.70E−04 | 1.10E−06 | 9.01E−05 | 1.89 | 0.88 | 0.01 | 8.5E−07 | 0.005 |
| Experimental Example 6* | 1 | 0.87 | 0.13 | 350 | 0.5 | 1.89E−04 | 1.02E−05 | 8.90E−05 | 2.12 | 1.01 | 0.11 | 1.2E−06 | 0.2 |
| Experimental Example 7* | 1 | 1 | 0.11 | 350 | 0.5 | 1.98E−04 | 9.97E−06 | 8.91E−05 | 2.22 | 1.11 | 0.11 | 1.1E−06 | 0 |

In Table 1, Experimental Examples 2, 3, 5 to 7 with the mark "*" are embodiments in which the lithium ionic conductivity is high. The other Experimental Examples are comparative examples. From these Experimental Examples, it is thought that when the molar ratio of LiBr, LiOH, and LiF which are the raw materials is 1:X:Y where $0.87 \leq X \leq 1$ and $0.01 \leq Y \leq 0.13$, it is possible to achieve a new lithium ion conductive material having relatively high lithium ionic conductivity. Further, it is found that the lithium ionic conductivity can be increased by including LiF even just a little bit in the raw materials.

Though detailed reason is not known, it is thought that the lithium ionic conductivity can be increased as a result of complicatedly relating whether $Li_5(OH)_{2-x}F_xBr_3$ (where $0 \leq x \leq 2$) which is a subphase is formed or not and existence of some unreacted raw materials to each other, from the above condition about X and Y. In this case, assuming that the composition formula is $Li_a(OH)_bF_cBr$, the value of "c" is not less than 0.01 and not more than 0.11, where $b = a - c - 1$ and the value of "a" has a range not less than 1.8 and not more than 2.3 depending on variations in the weighing process or the analysis process. More preferably, the value of "c" is not less than 0.05 and not more than 0.11. The above-described peak intensity ratio (B/(A+B)) in the X-ray diffraction spectrum is not less than 0 and not more than 0.2. More preferably, the peak intensity ratio (B/(A+B)) is not less than 0.02 and not more than 0.2.

The above-described lithium ion conductive material, all-solid-state secondary battery, and manufacturing method thereof are not limited to those described above but may be modified in various manners.

For example, the lithium ion conductive material may be used for any use other than the all-solid-state secondary battery. The manufacturing condition of the lithium ion conductive material may be changed as appropriate. Further, the raw materials used for manufacturing the lithium ion conductive material may include any other material.

As described earlier, the composition and the manufacturing method of the all-solid-state secondary battery 1 may be changed as appropriate. The positive electrode 11 and the negative electrode 12 described above are each only one example. In the all-solid-state secondary battery 1, instead of individually manufacturing the positive electrode 11 and the negative electrode 12 in advance, heating and pressurizing may be performed in a state where the current collector 111, the positive electrode layer 112, the lithium ion conductive material, the negative electrode layer 122, and the current collector 121 are layered.

Even when the same heat treatment as performed to obtain the above-described SUS cell is performed while using a plate of positive electrode layer, e.g., a plate of lithium cobalt oxide instead of one stainless steel plate and a plate of negative electrode layer, e.g., a plate including Ti, in which a lithium ion is insertable and removable at 0.4 V or more with the Li/Li+ equilibrium potential as the reference instead of the other stainless steel plate in the manufacture of the above-described SUS cell, the all-solid-state secondary battery can be manufactured.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 All-solid-state secondary battery
11 Positive electrode
12 Negative electrode
13 Lithium ion conductive material layer

The invention claimed is:
1. A lithium ion conductive material,
having a composition formula of $Li_a(OH)_bF_cBr$, where $1.8 \leq a \leq 2.3$, $b = a - c - 1$, $0.01 \leq c \leq 0.11$, and
including an antiperovskite-type crystal phase.
2. The lithium ion conductive material according to claim 1, further including
a layered antiperovskite-type crystal phase.
3. The lithium ion conductive material according to claim 2, wherein
$0 \leq B/(A+B) \leq 0.2$ is satisfied, where A is the peak intensity in the vicinity of $2\theta = 31.2°$ in the X-ray diffractometry using Cu-Kα ray and B is the peak intensity in the vicinity of $2\theta = 30.2°$.
4. An all-solid-state secondary battery, comprising:
a positive electrode;
a negative electrode; and
a lithium ion conductive material layer which is positioned between said positive electrode and said negative electrode and includes a lithium ion conductive material according to claim 1.
5. The all-solid-state secondary battery according to claim 4, wherein
said positive electrode includes a lithium composite oxide having a layered rock salt structure, and said negative electrode includes Ti, and includes a material in which a lithium ion is insertable and removable at 0.4 V or more with the Li/Li$^+$ equilibrium potential as the reference.

6. The all-solid-state secondary battery according to claim 5, wherein
said lithium composite oxide having a layered rock salt structure is lithium cobalt oxide.

7. A method of manufacturing a solid electrolyte, wherein LiBr, LiOH, and LiF are heated at a temperature not lower than 250° C. and not higher than 600° C. for 0.1 hours or more while being stirred at a molar ratio of 1:X:Y, where 0.87≤X≤1, 0.01≤Y≤0.13, under an Ar gas atmosphere.

8. An all-solid-state secondary battery, comprising:
a positive electrode;
a negative electrode; and
a lithium ion conductive material layer which is positioned between said positive electrode and said negative electrode and includes a lithium ion conductive material according to claim 2.

9. An all-solid-state secondary battery, comprising:
a positive electrode;
a negative electrode; and
a lithium ion conductive material layer which is positioned between said positive electrode and said negative electrode and includes a lithium ion conductive material according to claim 3.

\* \* \* \* \*